United States Patent [19]

George et al.

[11] Patent Number: 4,504,354
[45] Date of Patent: Mar. 12, 1985

[54] METHOD AND APPARATUS FOR FORMING GRAVURE CELLS IN A GRAVURE CYLINDER

[75] Inventors: Harvey F. George, West Hempstead; Yair Toor, Elmhurst, both of N.Y.

[73] Assignee: Gravure Research Institute, Inc., Port Washington, N.Y.

[21] Appl. No.: 414,345

[22] PCT Filed: Jul. 2, 1982

[86] PCT No.: PCT/US82/00892

§ 371 Date: Aug. 23, 1982

§ 102(e) Date: Aug. 23, 1982

[87] PCT Pub. No.: WO84/00121

PCT Pub. Date: Jan. 19, 1984

[51] Int. Cl.³ .......................... C23F 1/02; B44C 1/22
[52] U.S. Cl. ...................... 156/639; 156/345; 156/643; 156/652; 156/659.1; 156/645; 156/905; 204/129.65; 219/121 LJ; 219/121 LW; 219/121 LM; 427/53.1
[58] Field of Search ........... C03C/15/00; C25F/3/00; 156/345, 639, 645, 643, 652, 659.1, 905; 204/129.43, 129.65; 219/121 L, 121 LH, 121 LJ, 121 LM, 121 LW; 427/53.1; 430/307

[56] References Cited

U.S. PATENT DOCUMENTS

| | | | |
|---|---|---|---|
| 3,898,417 | 8/1975 | Atkinson | 219/121 |
| 4,042,006 | 8/1977 | Engl et al. | 164/46 |
| 4,063,063 | 12/1977 | Funck et al. | 219/121 LM |
| 4,081,654 | 3/1978 | Mracek | 219/121 |
| 4,087,281 | 5/1978 | Toda et al. | 96/36 |
| 4,105,468 | 8/1978 | Geshner et al. | 134/3 |
| 4,108,659 | 8/1978 | Dini | 96/36.3 |
| 4,139,409 | 2/1979 | Macken et al. | 156/634 |
| 4,224,101 | 9/1980 | Tijburg et al. | 156/643 |
| 4,258,078 | 3/1981 | Cellar et al. | 427/43.1 |
| 4,262,186 | 4/1981 | Provancher | 219/121 LH |

Primary Examiner—William A. Powell
Attorney, Agent, or Firm—Bollo & Drumm

[57] ABSTRACT

A method and associated apparatus for forming gravure cells in a gravure cylinder for accurately reproducing an image, including the steps of coating the peripheral surface of a gravure cylinder with an insulating coating, revealing a first group of predetermined portions of the coated gravure cylinder by selectively removing the insulating coating overlying portions of the peripheral surface of the gravure cylinder, ablating the first group of exposed portions of the gravure cylinder to a predetermined depth, and repeating the revealing and ablating steps until a predetermined number of different groups of predetermined portions of the gravure cylinder have been revealed with each previously revealed group having further portions of the gravure cylinder ablated to a greater predetermined depth during each ablating step to provide a gravure cylinder having the desired pattern of gravure cells of the desired depths for accurately reproducing an image.

41 Claims, 6 Drawing Figures

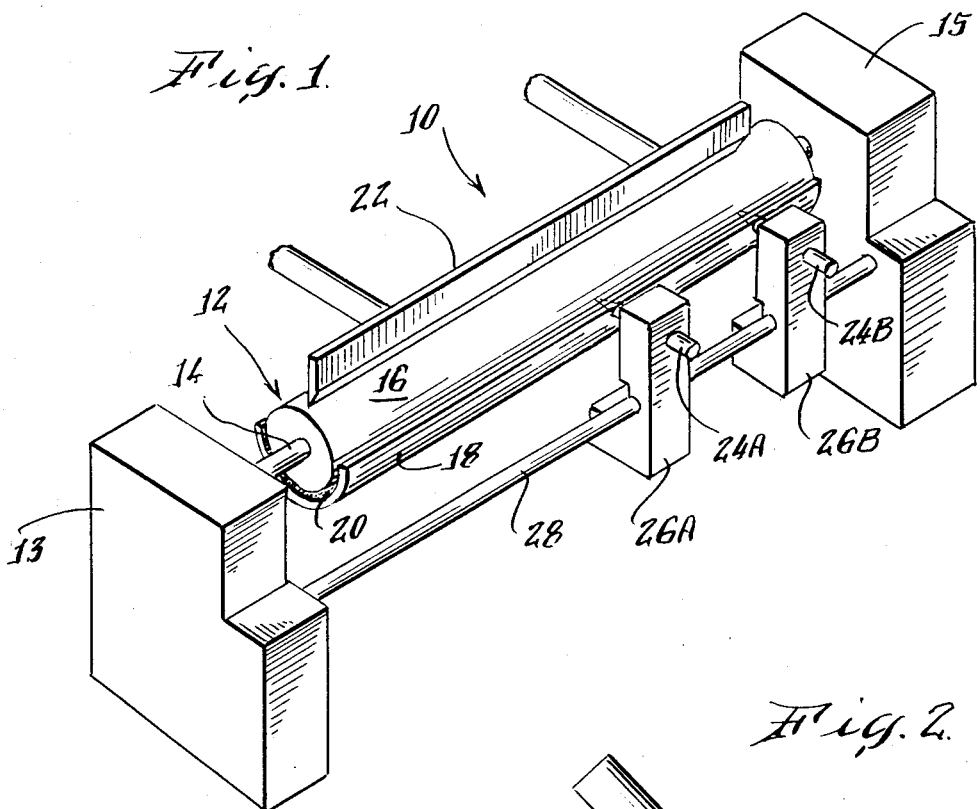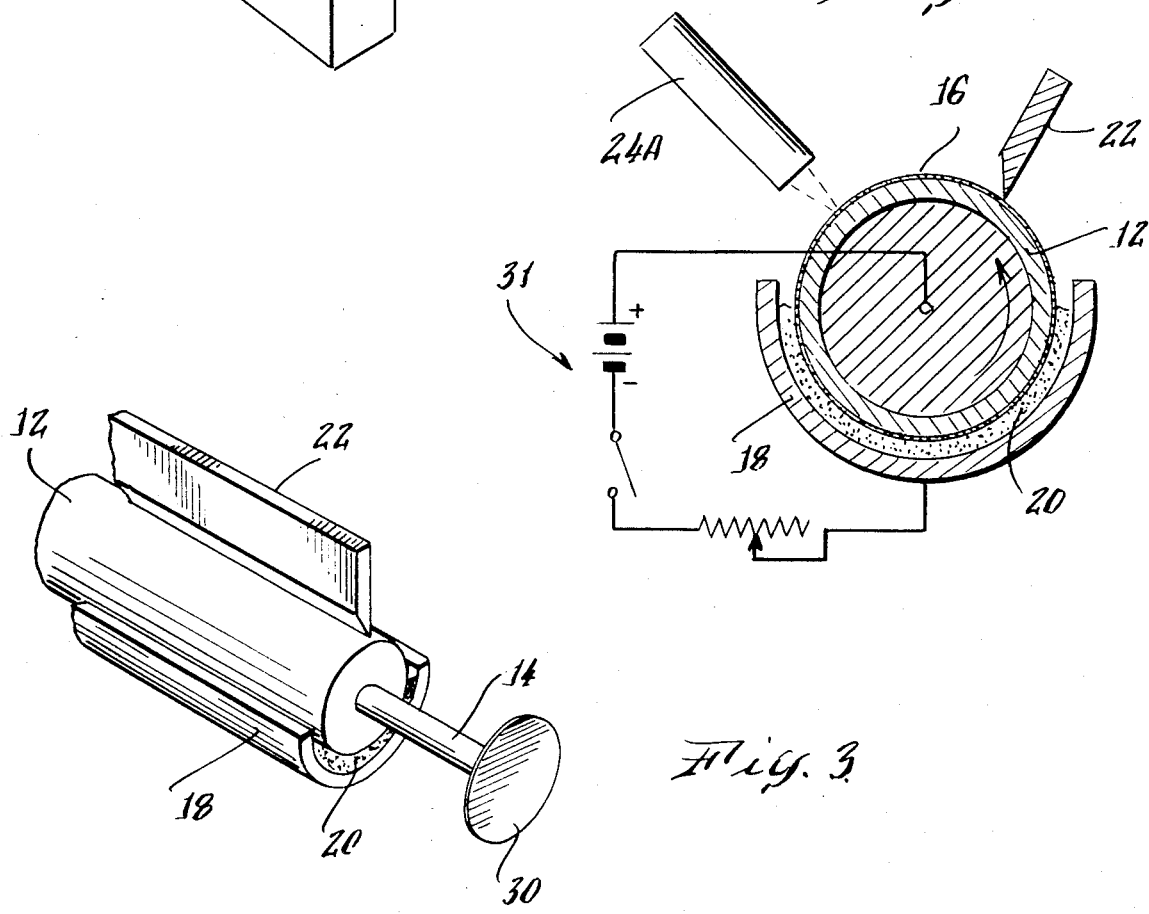

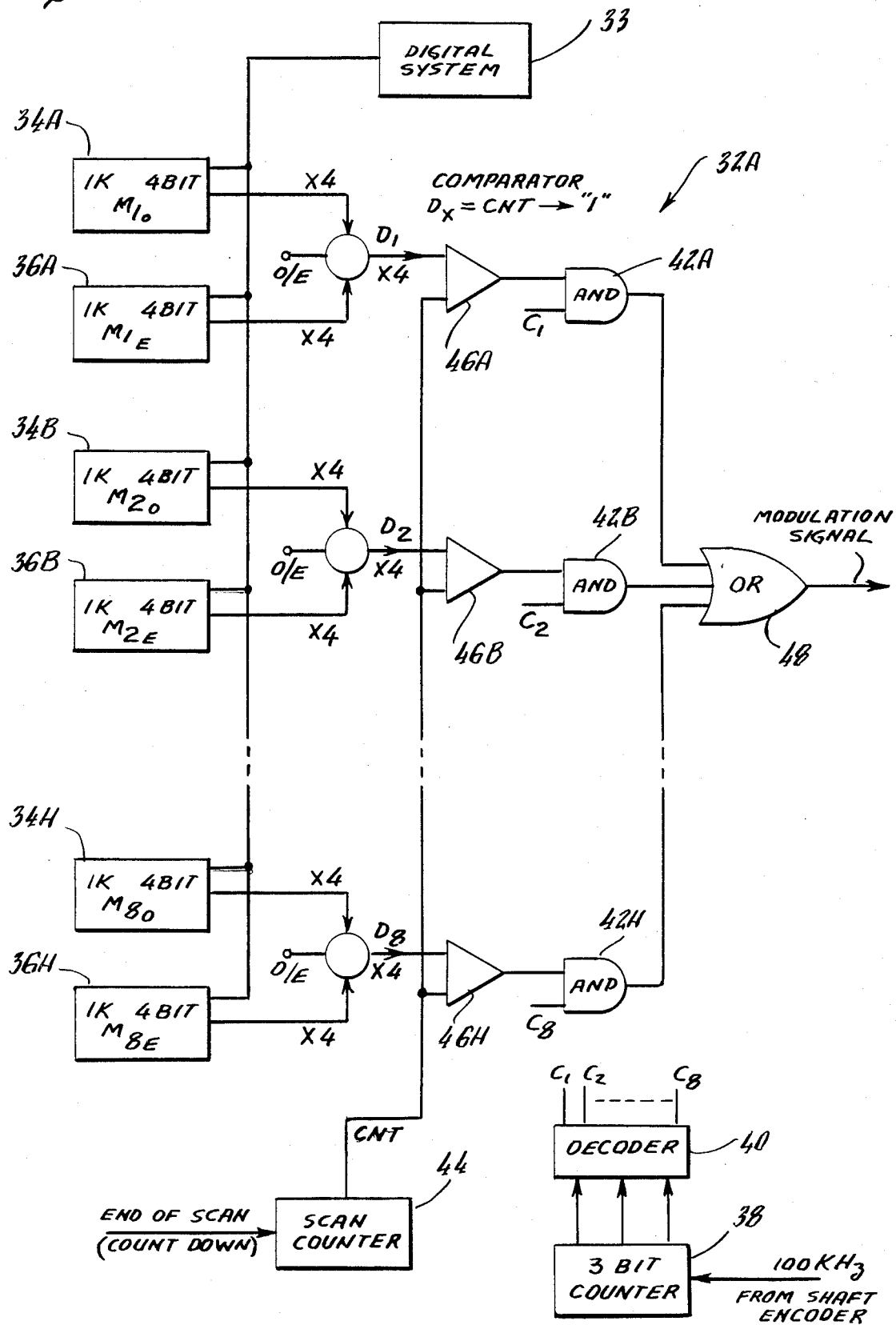

METHOD AND APPARATUS FOR FORMING GRAVURE CELLS IN A GRAVURE CYLINDER

BACKGROUND OF THE INVENTION

The present invention relates to gravure printing, and more specifically to a method and apparatus for forming gravure cells in a gravure cylinder.

Presently, with raster or screen gravure printing, copper cylinders are provided with a number of gravure cells of specified diameter and depth each of which corresponds to the tonal intensity of a particular image point of the original copy to be reproduced. The gravure cells are generally produced by chemical etching or by mechanical engraving using a stylus or by laser energy.

In the chemical etching process, formation of the individual gravure cells corresponding to the original copy is controlled by means of a variable permeability negative mask which covers the surface of the printing form. Permeability to the etchant is varied in accordance with the tonal values of the image points of the original copy. The mask (carbon tissue resist or DuPont Rotofilm resist) is formed by a photographic process of exposure to continuous tone and halftone positives made from the original copy. After transfer of the mask to the cylinder and development, the action of the etchant during the etching process occurs gradually over the surface of the gravure cylinder depending upon the level of light exposure at different points on the carbon tissue or Rotofilm resist. This method of providing a production gravure cylinder uses messy chemicals, is time-consuming, and highly operator dependent due to changing parameters such as the concentration of the etchant.

Presently, mechanical engraving is done with the Helio-Klischograph system available from the Hell Company or similar devices. Image information is either optically scanned from suitably prepared photographic copy or taken from computer memory. This information is used to direct a diamond stylus, vibrating it back and forth as the gravure cylinder is rotated. The diamond stylus cuts cells into the gravure cylinder in accordance with desired tones. This method of providing a production gravure cylinder is limited by the shape of the stylus and is often followed by etching to provide deeper cells.

U.S. Pat. No. 4,108,659 filed in the name of Mamilina Dini, discloses a method of engraving gravure cylinders with a laser beam which eliminates point-by-point scanning of the original picture format and therefore modulation of the energy output of the laser beam. The engraving power of the laser beam is controlled by a mask which modulates the laser beam in accordance with the tonal gradations in the original picture format. That is, the mask is constructed so that its reflectivity is inversely proportional to the tonal gradations of the original picture format. Engraving in accordance with this process requires the precise formation of the mask to accurately produce the desired pattern of gravure cells having the proper diameter and depths.

Another technique utilizing lasers includes coating the gravure cylinder with an epoxy material which is absorbent to a high power laser beam. The laser beam is used to produce a groove of varying depth and width rather than individual gravure cells. The lasers employed are quite expensive due to the high power levels required, as well as large in size. Further, special preparations are required for baking the epoxy coated cylinder. Additionally, there are uncertainties regarding the wear resistance of the epoxy material.

SUMMARY OF THE INVENTION

It is an object of the present invention to provide an improved method and apparatus for producing engraved gravure cylinders.

It is a further object of the present invention to provide an improved method and apparatus for producing engraved gravure cylinders which accurately produces gravure cells in both the desired diameter and depth.

It is a further object of the present invention to provide a method and apparatus for rapidly producing an engraved gravure cylinder.

It is a still further object of the present invention to provide a method and apparatus for engraving gravure cylinders which does not require the preparation of a mask, and which can engrave the cylinder when connected to a digital computer in a "filmless" manner.

It is a still further object of the present invention to provide a method and apparatus which is economical and uses relatively low cost power lasers.

It is a still further object of the present invention to provide a method and apparatus for engraving gravure cylinders in which the range of ink is readily controllable to provide light or dark cells, as desired.

Briefly, in accordance with the present invention, a method and associated apparatus is provided for forming gravure cells in a gravure cylinder for accurately reproducing an image, including the steps of coating the peripheral surface of a gravure cylinder with an insulating coating, revealing a first group of predetermined portions of the coated gravure cylinder by selectively removing the insulating coating overlying portions of the peripheral surface of the gravure cylinder, ablating the first group of revealed portions of the gravure cylinder to a predetermined depth, and repeating the revealing and ablating steps until a predetermined number of different groups of predetermined portions of the peripheral surface of the gravure cylinder have been revealed with each previously exposed group having further portions of the gravure cylinder ablated to a greater predetermined depth during each ablating step to provide a gravure cylinder having the desired pattern of gravure cells of the desired depths for accurately reproducing an image.

Other objects, aspects and advantages of the present invention will be apparent from the detailed description considered in conjunction with the preferred embodiments of the invention as illustrated in the drawings, as follows:

BRIEF DESCRIPTION OF THE DRAWINGS

FIG. 1 is a perspective view illustrating one embodiment of the apparatus of the present invention for engraving a gravure cylinder;

FIG. 2 is a cross-sectional view taken through the gravure cylinder of FIG. 1;

FIG. 3 is an enlarged perspective view of one end of the gravure cylinder illustrated in FIG. 1;

FIG. 4 is a schematic diagram of a modulation signal generator for use with the embodiment in FIGS. 1–3;

DETAILED DESCRIPTION

Figure 5:
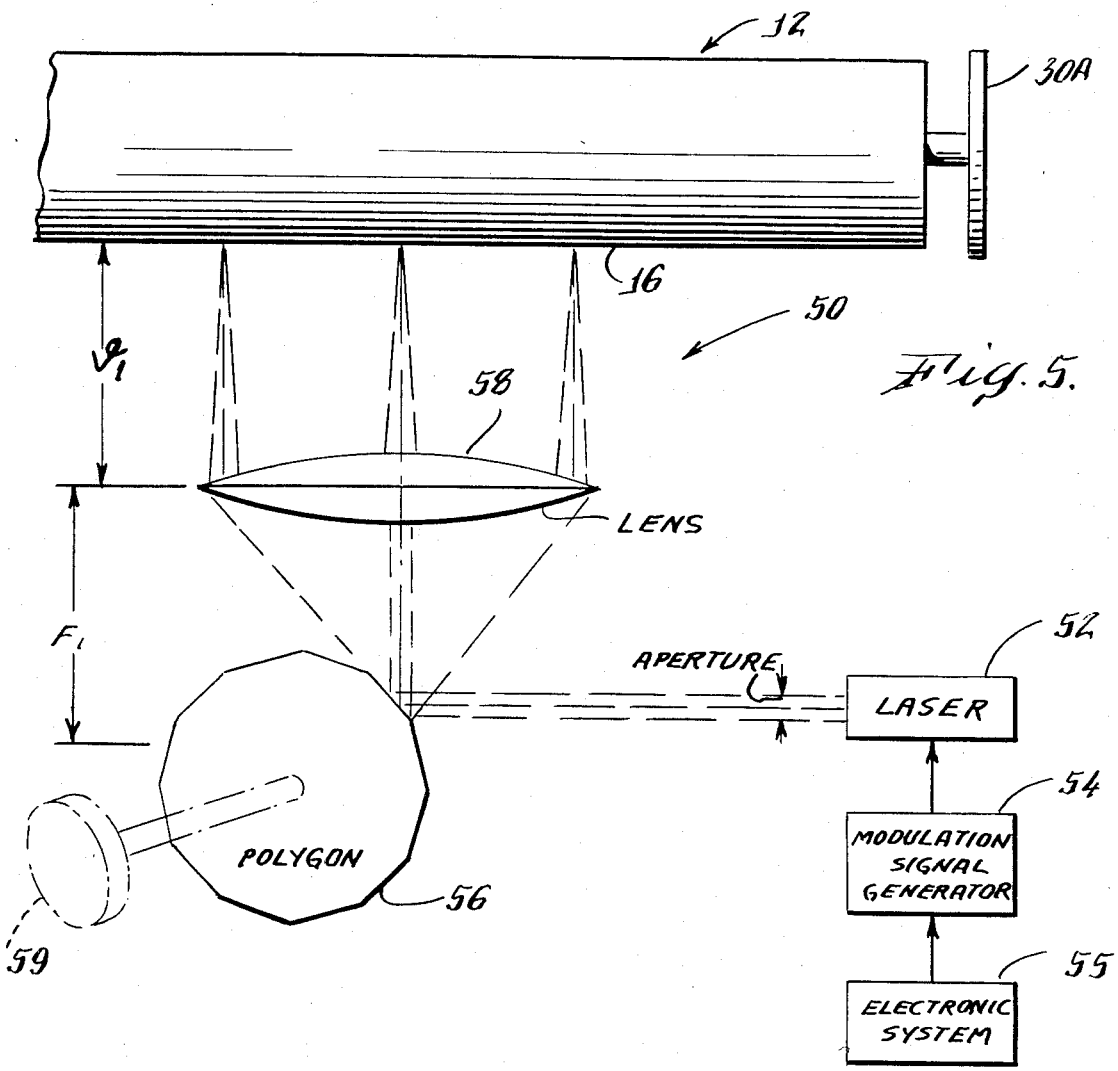
FIG. 5 is a schematic diagram of another embodiment of the apparatus of the present invention where the laser is stationary and the beam is deflected by optic means to scan the gravure cylinder.

Referring to FIG. 1, an apparatus in accordance with the present invention is generally illustrated at 10. A conventional copper gravure cylinder 12 mounted on shaft 14 is positioned between mounts 13 and 15 for rotation by conventional motor and gear means (not shown). The gravure cylinder 12 is coated with an insulating coating 16. When a laser is employed in the present invention, the coating 16 is made highly absorbent to the laser beam, and is preferably in the form of a thin coating of approximately 10 micrometers or less of a plastic material, such as PVC, which is soft and has a low boiling point for ease of removal, but which provides good insulation of the peripheral surface of the underlying gravure cylinder 12. Advantageously, the insulating coating 16 may be applied to the gravure cylinder 12 prior to positioning the gravure cylinder 12 between mounts 13 and 15. Spaced adjacent from the gravure cylinder 12 and closely conforming to a portion of its periphery is a metallic trough or housing 18. The metallic trough 18 is preferably arranged circumjacent the gravure cylinder 12 and closely conforms to a substantial portion of the periphery of the gravure cylinder 12. Arranged within the trough 18 is an electrolyte 20, which is seen more clearly in FIG. 2. An acceptable electrolyte is $CuSO_4$, although it should be understood that any of the various electrolytes which have the ability to rapidly ablate or deplate copper are satisfactory. Advantageously, a doctor blade 22 can be arranged adjacent to the gravure cylinder 12 to remove excessive electrolyte 20.

Mounted adjacent to the gravure cylinder 12 are a plurality of lasers 24, two such lasers are illustrated as 24A and B. The number of lasers 24 to be used will depend upon the length of the cylinder 12 and the segment of that length to be scanned by each laser 24, as will be discussed in more detail below. Each laser 24A and B is mounted to its carriage 26A and 26B, respectively, for movement along the axis of a shaft 28 which extends between mounts 13 and 15 and is arranged parallel to the longitudinal axis of the gravure cylinder 12.

Referring to FIG. 2, the trough 18 as shown extends slightly beyond 50% of the periphery of the gravure cylinder 12 with the electrolyte 20 contained therein. The position of the lasers 24A and B and doctor blade 22 are shown relative to the gravure cylinder 12 to allow for removal of excessive electrolyte 20 prior to exposing the coated gravure cylinder 12 to the lasers 24A and B.

Referring to FIG. 3, the shaft 14 of the gravure cylinder 12 is coupled at one end to a conventional shaft encoder 30 for converting the circumference of the gravure cylinder 12 into a plurality of discrete electrical signals.

One form of modulation signal generator for each laser 24 is illustrated in FIG. 4. The modulation signal generator shown in FIG. 4 is designated as 32A for association with laser 24A although it should be understood that each laser 24B et al, will have such a modulation signal generator associated with it. Assuming a gravure cylinder 12 having 7500 cells, including spaces, per each line of its circumference, to provide sixteen (16) levels of engraving, which is preferred for providing the best results, eight $1K \times 4$ bit memories are required. However, to increase the speed of response two such memory banks are used, M odd ($M_o$) and M even ($M_e$). A conventional digital system 33 such as R300, available from SCITEX, is programmed in a conventional manner to transmit the stored data representative of each line circumference, one cirumference at a time, to the memories $M_o$ and $M_e$. Conventional electronic converter means are utilized for providing the stored data to the computer resulting from the point-by-point scanning of the original picture format. This data is stored in $M_o$34 or $M_e$36 whichever memory is not operating to modulate the respective laser 24. In this way one line of the circumference is prepared in advance. That is, if $M_o$ is modulating the laser the computer will send data to $M_e$. Memories $M_o$ and $M_e$, as shown in FIG. 4, are divided into 8 ($1K \times 4$) bit memories shown as 34 A through H and 36 A through H, respectively. Signals from the shaft encoder 30 are used to advance the address of the memories $M_o$ 34A–H and $M_e$ 36A–H. The signals from the encoder 30 are also transmitted to a 3 bit counter 38 whose output is applied to a conventional decoder 40 which produces outputs $C_1$ through $C_8$. The outputs $C_1$ throu $C_8$ of decoder 40 are applied to AND gates 42A through H.

The data for each gravure cell stored in the memories 34 or 36 is read before it is transmitted to the laser 24 and compared to the content of a scan counter 44. If the 4 bit signal present at a particular memory address, $D_1$ through $D_8$, and the output of the scan counter 44 are equal, $D_X = C_{NT}$, the proper comparator 46A through H will output a "1". The gate timing signals $C_1$ through $C_8$ resulting from the shaft encoder 30 will open the respective AND gate 42 A through H when the output of comparator 46A through 46H is coincident therewith. The outputs from the AND gates 42A through H are coupled to an OR gate 48. When an output is present at any one of the inputs to the OR gate 48, the OR gate 18 will produce an output pulse or modulation signal and its associated laser will reveal the surface of the gravure cylinder 12 underlying the insulation 16 by burning a hold through the insulation 16 at a point which corresponds to a particular gravure cell location. Since it is desired to have 16 levels of engraving, data is sent from the memories 34 and 36 sixteen times during the engraving. However, during each of the 16 scans of the laser 24A, the modulation signal generator 32A will cause the laser 24A to produce an output pulse for burning holes in the insulation coating 16 only at the locations on the gravure cylinder 12 where the gravure cells are to be engraved.

Since there are eight lasers 24A through H, the computer feeds the data for 8 different circumferences during the time the cylinder makes a complete revolution. e.g., 75 milliseconds. Based on the foregoing assumptions and in accordance with the Example below, 90 M bytes of high speed storage will be required for the engraving.

EXAMPLE

Upon making the following assumptions, we can proceed to calculate the engraving time and current densities.

1. The insulation coating 16 is to be very thin and less than 10 micrometers.
2. It must have a high emissivity at the wavelength of the laser, here 10.6 micrometers the wavelength of a $CO_2$ laser.

3. The power output of the laser will be approximately 10 to 20 watts. Such power is sufficient to burn through the coating in less than 10 microseconds.

4. Sixteen (16) engraving levels will provide good prints.

5. The size of the gravure cylinder is 32 pages, each page 10 inches wide by 12 inches high, 8 pages wide with 4 pages on the circumference, and 150 lines per inch, which is a typical image point resolution for gravure cells to produce good prints.

With the foregoing assumptions, we can make the following calculations.

Number of cells on the circumference, $4 \times 12'' \times 150 = 7,200$ with the spaces, 7,500 cells along the circumference.

Number of cells per laser (one of eight) $150 \times 10'' = 1,500$.

For each laser to cover one discrete segment of the length of the cylinder during a scan it has to move 1,500 positions with each position requiring one cylinder revolution. Therefore, to complete 16 levels of engraving the cylinder has to make:

$$16 \times 1,500 = 24,000 \text{ revolutions.}$$

If the engraving time is to be 30 min. then the speed is:

$$\frac{24,000}{30} = 800 \text{ RPM or } 13.3 \text{ RPS (Revolutions Per Second.)}$$

The time for revealing the copper, i.e., burning through the coating is $$t_p = \frac{1}{13.3} \times \frac{1}{7,500} = 10 \text{ microseconds}$$

and the modulation frequency is 100 KHz per laser.

The time to scan longitudinally 10" is:

$$t_{SCN} = 1500 \times \frac{1}{13.3} = 112.8 \text{ sec.}$$

To calculate the laser retrace time, the required current density must be specified.

Assuming gravure cell dimensions as follows:
Diameter: 0.144 mm
Depth: 0.030 mm
Cell Volume: $Vc = 4.89 \times 10^{-13}$ m$^3$
Cell Mass: $Mc = 4.36 \times 10^{-6}$ gr
Cell Area: $Ac = 1.63 \times 10^{-4}$ cm$^2$.

Engraving by electrolysis using Faraday's constant: $F = 96489$ Amp. sec. is according to the equation:

$$\frac{I \times t}{F} = \frac{Mc}{31.77} \quad \begin{array}{l} I = \text{current (Amp)} \\ t = \text{time (Sec.)} \\ 31.77 = \text{gram equivalent of copper} \end{array}$$

$$I \times t = \frac{Mc \times F}{31.77} = \frac{4.36 \times 10^{-6} \times 96489}{31.77} = 0.0132 \text{ Amp Sec.}$$

This is the electric charge for engraving cells 30 micrometers deep, and 144 micrometers in diameter. It must be divided by the number of laser retrace cycles used, here sixteen. If we assume 1 amp/cm$^2$ we get the current required per cell:

$$1 = Ac \times J = 1.63 \times 10^{-4} \text{ Amp.} \quad \begin{array}{l} J \text{ - Current density} \\ (A/cm^2) \\ Ac = \text{Cell area (see above)} \end{array}$$

The time to engrave a cell:

$$t_c = \frac{I \times t}{1} = \frac{0.0132}{1.63 \times 10^{-4}} = 80.98 \text{ sec. or approximately } 80 \text{ sec.}$$

After division by 16 retrace cycles:

$$t \text{ engrave} = \frac{80}{16} = 5 \text{ sec.}$$

Since the trough or cathode does not surround the circumference of the cylinder, the effective engraving is only a portion of the retrace time. If we assume that engraving is occurring during only 50% of the retrace time, then t retrace = $2 \times $ t engrave = 10 sec. This will add about 10% to the total engraving time bringing it to 33 minimum.

Advantageously, if desired, the diameter of the gravure cells to be engraved can be controlled by interposing conventional lenses and/or masks (not shown) between the lasers 24 and the gravure cylinder 12. Changes in the depth increments for each laser scan can be controlled by changing the level of current present in the electrolyte.

In operation, the coated gravure cylinder 12 is rotated through the electrolyte bath in trough 18. The effective printing width of the gravure cylinder 12 is 80 inches, so that 8 lasers 24 A through H are used each covering a separate and discrete 10 inch segment of the length of the cylinder 12. Each laser 24A through H moves along its allotted 10 inch cylinder segment on shaft 28 via carriages 26 A through H, respectively, e.g., with conventional stepping motors (not shown). As the lasers 24 move, signals are transmitted thereto from their respective modulation signal generators 32. Each line or circumference of the gravure cylinder 12 includes data representing portions of the coating 16 where gravure cells are to be engraved. Upon receiving a signal pulse from a modulation signal generator 32, the associated laser 24 is energized as it traverses its allotted sigment of the length of the gravure cylinder 12 (scan time). Once each of the lasers 24 A through H has scanned the length of its allotted segment, the lasers 24 are de-energized, reversing their transverse movement, and returned to their initial position. During this return or retrace time, the lasers are "off". They are modulated "on" and "off" only during the scan time.

At the end of the scan time and during the retrace time, the metallic trough 18 is connected via circuit means 31, see FIG. 2, to a negative potential and the gravure cylinder 12 is connected to a positive potential. Thus, the trough 18 becomes a cathode and the gravure cylinder 12 an anode. As the gravure cylinder 12 rotates through the trough 18, a portion of the gravure cylinder 12 (approximately 50%) is exposed to the electrolyte 20. The electrolytic action of the electrolyte 20 causes electrochemical deplating of those peripheral portions of the gravure cylinder 12 where the insulation coating 16 has been burned away by the lasers 24.

Preferably, there are 16 laser scan cycles so that the original group of gravure cells exposed during the first scan will be subjected to electrolytic deplating 16 times, the second group 15 times etc. until we reach the sixteenth group which is exposed only once. During each deplating period, the revealed portions of the gravure cylinder 12 are engraved or deplated by electrolysis to a predetermined depth by controlling the current. Advantageously, the potential between the anode (gravure cylinder) and cathode (trough) may be changed via circuit means 31 during each retrace period to cause engraving or deplating to a predetermined depth which is different from the deplating depth achieved during prior periods. During each subsequent scan, groups of gravure cells which are to be engraved to a lesser depth are revealed by burning holes in the coating 16. The engraving is completed when the 16 scan cycles and the 16 retrace periods are completed. Thereafter, the coating 16 is removed e.g., with a conventional solvent, since it is only used in the engraving process.

During the retrace time or deplating period the deenergized lasers 24A through H are returned to their initial position and the electrochemical deplating or etching is accomplished. Further, as apparent from the above Example, the retrace time period determines the current density of the electrolyte.

Although the foregoing ablating step has been described with reference to electrolysis, which is preferred, it should be understood that the ablating step can be accomplished with a conventional etchant such as Fe Cl$_2$ within which the gravure cylinder 12 is immersed during the laser retrace time. This can be accomplished by lowering the gravure cylinder 12 into the etchant bath or raising the etchant bath to surround the periphery of the gravure cylinder 12. When utilizing etching, the insulating coating 16 may be any conventional coating which is resistant to the etchant while still being absorbent to a laser beam.

Referring to FIG. 5, an alternative laser scanning arrangement is generally illustrated as 50. With this arrangement the laser 52 is stationary and the laser beam is deflected to scan a specified length of the gravure cylinder 12. Advantageously the laser 52 may be a YAG laser, Model 117, available from Quantronix, having an aperture of 0.7 mm, a divergence of 2.5 mrad, a pulse rate of approximately 50 KHz to 500 KHz, a pulse width of approximately 20 nS to 200 nS, a pulse peak power of approximately 1500 to 4500 watts, and a pulse energy of approximately 30 $\mu$J to 900 $\mu$J. A modulation signal generator 54 similar to the one illustrated in FIG. 4 activates the laser 52 to turn it "on" or "off". The input to the modulation signal generator 54 is provided from an electronic system 55 which will be described in more detail with reference to FIG. 6.

The beam from stationary laser 52 will scan a specified line segment of the longitudinal length of the gravure cylinder 12 by deflection from a rotating polygon mirror 56. The polygon mirror 56 is rotated by conventional motor means (not shown), and is preferably a twelve sided polygon. However, it should be understood that a vibrating mirror may also be used in place of the rotating polygon mirror 56.

A convex lens 58 is positioned adjacent the gravure cylinder 12 at a distance V$_1$ therefrom to intercept and focus the laser beam which is deflected from the rotating polygon mirror 56. Since it is desired that the laser beam strike the peripheral surface of the gravure cylinder 12 perpendicularly for scanning a line of the length of the gravure cylinder 12, the lens 58 is arranged relative to the polygon mirror 56 at a distance F$_1$ therefrom so that if the deflected beam from the polygon mirror 56 strikes the lens 58 within its focus then the laser beam will strike the gravure cylinder 12 perpendicularly.

The gravure cylinder 12 will be driven at a relatively slow speed with a conventional motor (not shown) and the polygon mirror 56 at a high speed with a conventional motor (not shown), both synchronized to allow the laser beam to provide a line scan of a 10" segment of the length of the gravure cylinder 12. After the entire circumference of the allotted segment, here 10", of the gravure cylinder 12 has been scanned 16 times by the laser beam, since 16 discrete ablating levels are preferred, as previously described, either the gravure cylinder 12 or the laser 52, and its associated optics in the form of polygon mirror 56 and lens 58, are moved relative to one another to scan the next allotted segment of the gravure cylinder 12. This is repeated until the desired length of the gravure cylinder 12 is fully engraved, here 8 times for an 80" length.

Figure 6:
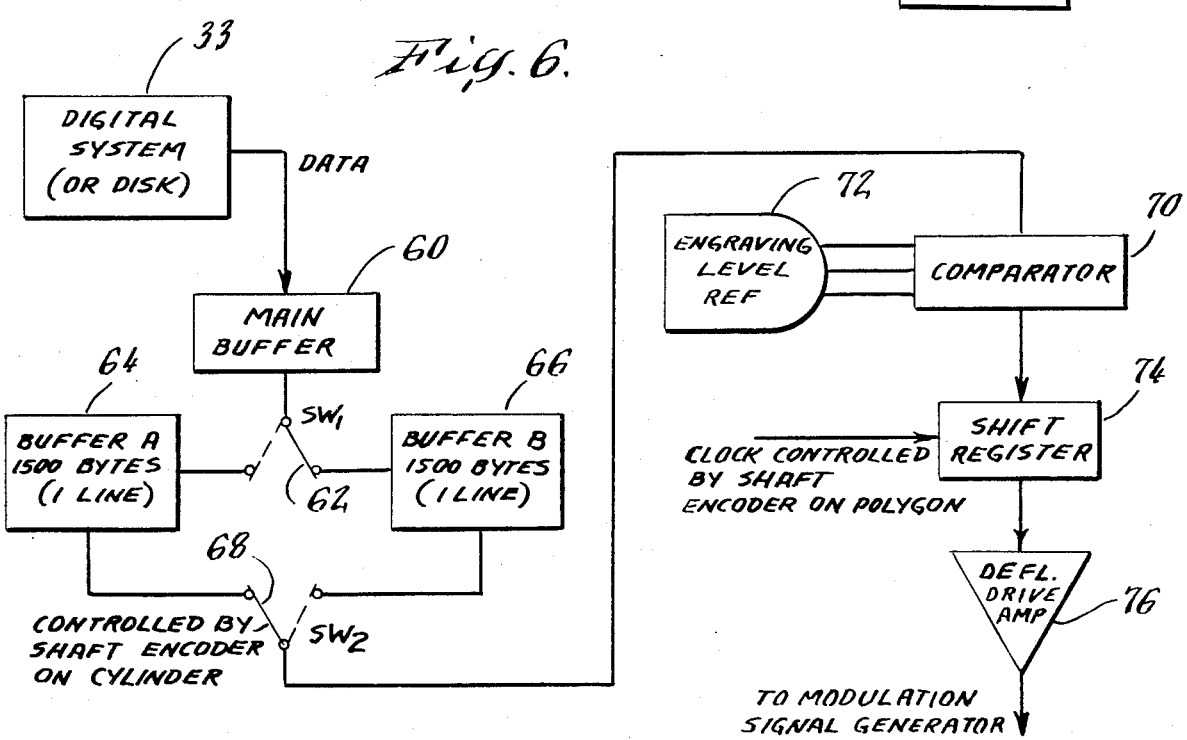
FIG. 6 is a schematic diagram of the electronic system for use with the embodiment in FIG. 5.

Referring to FIG. 6, the electronic system 55 for use in the embodiment of FIG. 5 is illustrated. Data from the disk of digital system 33 is fed to a main buffer 60 in blocks of one horizontal line of 1500×8 bits. The buffer 60 maintains the flow of data during the "fetch track" time on the disk. A first digital switch (SW$_1$) 62 will direct the data to one of two available buffers 64 or 66, whichever one is not transmitting data (busy). A second digital switch (SW$_2$) 68 will output data from the transmitting buffer 64 or 66 to a comparator 70. Digital switch 68 is controlled by the output of shaft encoder 30A coupled to the gravure cylinder 12. The shaft encoder 30A will produce a code for each horizontal line. Since we have assumed 7500 horizontal positions (cells and spaces) on the circumference of the gravure cylinder 12, the shaft encoded 30A must produce at least 7500 codes. During the rotation of the gravure cylinder 12, every time the shaft encoder 30A changes its code a new line is required. Whereupon, switch 68 will flip from one side to the other and the opposite buffer 64 or 66 will be connected to the comparator 70. When buffer 64 outputs data to the comparator 70 through switch 68, switch 62 will input data to buffer 66 and vice versa.

The comparator 70 compares the data from buffer 64 or 66 with a reference engraving level 72, which is a revolution counter for the gravure cylinder 12. The deepest level is engraved during the first revolution. If the data compares with the revolution number the laser beam will be enabled and the coating at the corresponding point on the gravure cylinder 12 will be removed. Specifically, the comparator 70 will send an output signal to a shift register 74. The shift register also receives an output from a clock (not shown) controlled by shaft encoder 59 coupled to the shaft of the polygon mirror 56. The shaft encoder 59 coupled to the polygon mirror 56 provides decoding of the position along the horizontal line. The shaft encoder 59 must produce 1500×12 codes per one complete revolution of the polygon mirror 56. Every time a code is changed on the shaft encoder 59 a new gravure cell is in position to be revealed.

The output of the shift register 74 provides a synchronized changing input containing the information for each new gravure cell to a deflection amplifier 76 which will send a signal to the modulation signal generator 54. If a gravure cell is to be revealed (comparator output "1"), the deflection driver amplifier 76 will emit a signal deflecting the laser beam so that it will hit the rotating polygon mirror 56, the lens 58 and the gravure cylinder 12, thereby removing the coating 16 on the gravure cylinder 12 so that ablating or deplating can subsequently take place at that specific portion on the peripheral surface of the gravure cylinder 12. If the output gravure cell is not to be exposed (comparator output "0"), the deflection drive amplifier 76 will emit a signal which de-energizes the laser 52 or prevents the laser beam from hitting the gravure cylinder 12.

It should be understood that various modifications may be made in present invention such as, without limitation, using energy forms other than a laser beam or using mechanical means to remove the coating to reveal the locations in the peripheral surface of the gravure cylinder where gravure cells are to be formed, and such as accomplishing the ablating step with etching as well as electrolysis, all without departing from the spirit and scope thereof as described in this specification and defined in the appended claims.

What is claimed is:

1. A method of forming gravure cells in a gravure cylinder for accurately reproducing an image, comprising the steps of:
    a. coating the peripheral surface of a gravure cylinder with an insulating coating;
    b. revealing a first group of predetermined peripheral portions of the gravure cylinder by selectively removing the insulating coating overlying such portions of the peripheral surface of the gravure cylinder;
    c. ablating the first group of revealed portions of the gravure cylinder to a predetermined depth; and
    d. repeating the exposing and ablating steps until a predetermined number of different groups of predetermined peripheral portions of the gravure cylinder have been exposed with each previously revealed group of portions having further portions of the gravure cylinder ablated to a greater predetermined depth during each ablating step to provide a gravure cylinder having the desired pattern of cells of the desired depths for accurately reproducing an image.

2. The method recited in claim 1, wherein:
the step of ablating is accomplished by electrolysis and includes the steps of placing the gravure cylinder in an electrolyte housed within a cathode; and coupling the gravure cylinder to a positive potential and the cathode to a negative potential for a predetermined period of time.

3. The method recited in claim 1, wherein:
the step of ablating is accomplished by chemical etching for a predetermined period of time.

4. The method recited in claim 1, wherein:
the step of revealing is accomplished with a laser beam which scans the gravure cylinder and removes the insulating coating from predetermined peripheral portions of the gravure cylinder.

5. The method recited in claim 4, wherein:
the step of revealing includes the step of deflecting the laser beam to scan a predetermined segment of the length of the gravure cylinder.

6. The method recited in claims 4 or 5, wherein:
the repetition of steps b. and c. includes a predetermined number of subsequent laser scans each such scan followed by ablating to remove a predetermined depth of the gravure cylinder from the revealed gravure cylinder portions in discrete steps to provide a gravure cylinder with a cell pattern having cells of varying depths.

7. The method recited in claim 1, wherein:
the step of revealing includes the steps of rotating the gravure cylinder; arranging movable lasers adjacent the gravure cylinder for movement parallel to the longitudinal axis of the gravure cylinder; scanning the length of the gravure cylinder with the movable lasers in discrete sigments.

8. The method recited in claim 7, including the steps of:
storing signals representative of the desired gravure cell pattern for the gravure cylinder;
modulating the lasers in response to the stored signals representative of the desired grave cell pattern for the gravure cylinder.

9. The method recited in claims 4 or 5, including the step of:
modulating the laser beam to expose predetermined groups of gravure cells on the peripheral surface of the gravure cylinder.

10. The method recited in claim 1, wherein:
the step of revealing includes scanning with a laser beam whose path is optically deflected to remove selective portions of the insulating coating.

11. A method of forming gravure cells in a gravure cylinder for accurately reproducing an image, comprising the steps of:
coating a gravure cylinder with an electrically insulating coating;
rotating the gravure cylinder;
conducting a first scan of the peripheral surface of the gravure cylinder with at least one laser beam to cover a discrete segment of the length of the gravure cylinder;
modulating the laser beam during the first scan to selectively reveal predetermined portions of gravure cylinder designated as a first group by removing the insulating coating therefrom;
de-energizing the laser beam after the first scan is completed;
ablating those portions of the surface of the gravure cylinder revealed by the laser beam during the period when the laser beam is de-energized to remove portions of the gravure cylinder from the revealed portions to a predetermined depth; and
conducting subsequent laser beam scans for revealing other groups of predetermined portions of the insulating coating, each subsequent laser beam scan followed by the step of ablating until a predetermined number of different groups of predetermined portions of the peripheral surface of the gravure cylinder have been revealed with each previously revealed group of predetermined portions having further portions of the gravure cylinder ablated to a greater predetermined depth during each ablating step to provide a gravure cylinder having the desired pattern of gravure cells of the desired depths for accurately reproducing an image.

12. The method recited in claim 11, wherein:
the scanning is accomplished by deflecting the laser beam.

13. The method recited in claim 11, wherein:
the scanning is accomplished by moving the laser beam parallel to the longitudinal axis of the gravure cylinder.

14. The method recited in claim 11, wherein:
the ablating step is accomplished by electrolysis.

15. The method recited in claim 11, wherein:

the ablating step is accomplished by etching.

16. The method recited in claim 11, wherein:

the step of modulating the laser beam includes providing signals representing the gravure cell pattern desired to be engraved in the gravure cylinder; providing signals representing the circumference of the gravure cylinder to be scanned; energizing the laser beam when there is coincidence of the signals representing the gravure cell pattern and the circumference of the gravure cylinder.

17. The method recited in claim 14, including the steps of:

providing an electrolyte;

providing a metallic housing for the electrolyte which also functions as a cathode;

applying a negative voltage to the cathode and a positive voltage to the gravure cylinder during the ablating step to provide electrolysis of those portions of the peripheral surface of the gravure cylinder which have been revealed by the laser beam.

18. The method recited in claim 17 including the step of:

controlling the depth of the gravure cylinder to be removed during electrolysis by varying the voltage between the gravure cylinder and metallic housing.

19. Apparatus for forming gravure cells in a gravure cylinder for accurately reproducing an image, comprising:

a gravure cylinder having an insulating coating thereon;

removal means positioned adjacent to the gravure cylinder for selectively removing predetermined portiohs of the insulating coating to reveal a first group of peripheral portions of the gravure cylinder;

ablating means providing an ablating period for ablating a predetermined depth of the gravure cylinder from the fist group of peripheral portions;

said removal means further selectively removing other predetermined portions of the insulating coating to reveal subsequent groups of peripheral portions; and said ablating means providing subsequent ablating periods for further ablating all previously revealed groups of peripheral portions to provide a gravure cylinder having the desired pattern of gravure cells with the desired cell depths for accurately reproducing an image.

20. The apparatus recited in claim 19, wherein:

said insulating coating is highly absorbent to a laser beam;

said removal means includes at least one laser and modulation means for activating said laser to selectively reveal predetermined portions of the periphery of the gravure cylinder underlying the insulating coating.

21. The apparatus recited in claim 20, including:

optical means for deflecting the beam of said laser for scanning a predetermined segment of the length of said gravure cylinder.

22. The apparatus recited in claim 21, wherein:

said optical means including a rotatable polygon mirror for deflecting the laser beam and a lens for focusing the deflected laser beam to scan a discrete line segment of said gravure cylinder.

23. The apparatus recited in claim 19, wherein:

said ablating means includes an electrolytic bath to which said gravure cylinder is exposed for a predetermined time.

24. The apparatus recited in claim 19, wherein:

said ablating means includes an etchant to which said gravure cylinder is exposed for a predetermined time.

25. The apparatus recited in claim 19, wherein:

said removal means includes a plurality of lasers mounted for movement along an axis parallel to the longitudinal axis of said gravure cylinder with each laser arranged to scan a predetermined length of said gravure cylinder.

26. The apparatus recited in claim 19, wherein:

said ablating means includes an electrolytic bath having a metallic housing arranged circumjacent the gravure cylinder for immersing a portion of said gravure cylinder therein, and circuit means for connecting a positive potential to said gravure cylinder and a negative potential to said metallic housing.

27. The apparatus recited in claim 26, including:

means for varying the potential between said gravure cylinder and said metallic housing to control the depth of the gravure cylinder to be ablated during each ablating period.

28. The apparatus recited in claim 20, wherein:

said modulation means includes means for modulating said laser in accordance with a predetermined pattern of gravure cells to be engraved in the gravure cylinder.

29. The apparatus recited in claim 20, including:

encoding means for encoding signals representative of the circumference of the gravure cylinder for interaction with said modulation means.

30. Apparatus for forming gravure cells in a gravure cylinder for accurately reproducing a desired image, comprising:

a gravure cylinder coated with an electrical insulator;

at least one laser arranged adjacent said gravure cylinder for scanning a discrete segment of the length of said gravure cylinder;

an electrolytic bath arranged proximate to said gravure cylinder;

means for rotating said gravure cylinder through said electrolytic bath;

modulation means for modulating said laser during a first scan to reveal a first group of predetermined portions of the peripheral surface of the gravure cylinder which underlie the electrical insulator;

means for subjecting the portions of said gravure cylinder exposed by said laser to electrolysis to engrave the first group of predetermined portions to a predetermined depth;

said modulation means activating said laser for revealing subsequent groups of predetermined portions of the peripheral surface of said coated gravure cylinder; and said electrolysis means providing electrolysis of all previously revealed groups of predetermined portions subsequent to each laser scan so that upon completion of the final laser scan and electrolysis a gravure cylinder is provided having the desired pattern of gravure cells with the desired depths for accurately reproducing an image.

31. The apparatus recited in claim 30, including:

metallic housing means for the electrolytic bath;

said electrolysis subjecting means having circuit means for connecting a positive potential to said gravure cylinder and a negative potential to said housing means.

32. The apparatus recited in claim 30, including:

laser moving means for moving said laser along a predetermined allotted length of said gravure cylinder;

means for returning said laser to its initial position after it has completed its movement along its predetermined allotted length.

33. The apparatus recited in claims 30, including:

optical means for deflecting each laser beam to scan a predetermined segment of the length of said gravure cylinder.

34. The apparatus recited in claim 33, wherein:

said optical means includes a movable mirror for deflecting the laser beam and a lens positioned relative to said movable mirror to focus the deflected laser beam along a specified line segment of the length of said gravure cylinder.

35. The apparatus recited in claim 31, wherein:

said circuit means includes means capable of varying the potential between said gravure cylinder and said housing means during activation of said electrolysis subjecting means to control the depth of the gravure cylinder to be engraved.

36. The apparatus recited in claim 30, including:

digital processing means electrically coupled to said modulation means for providing signals to said modulation means representing the gravure cell pattern to be engraved in said gravure cylinder;

encoding means providing signals representing the circumference of the gravure cylinder to said modulation means;

said modulation means including gate means for activating said lasers when there is coincidence between the signals from said digital processing means and said encoding means.

37. The apparatus recited in claim 30, wherein:

said modulation means includes a modulation signal generator for said laser, said modulation signal generator includes memory means for receiving and storing data from a digital processing means for each discrete circumference of the gravure cylinder; scan counter means for providing output signals indicative of the scan number; comparator means for receiving the output signals from said memory means and said scan counter and providing an output signal when the content of said memory means is equal to the content of said scan counter; first gate means for receiving the output from said comparator means and timing input signals representative of the circumference of said gravure cylinder, said first gate means providing an output signal when there is coincidence between the output of said comparator means and the timing input signals; second gate means for providing a signal to its associated laser when a signal is present at the output of said first gate means.

38. The apparatus recited in claim 37, including:

encoder means for providing input signals representative of the circumference of said gravure cylinder to said comparator means.

39. The apparatus recited in claim 34, wherein:

said gravure cylinder is moved relative to said optical means and said laser to allow said laser to scan said gravure cylinder in discrete segments.

40. The apparatus recited in claim 34, wherein:

the laser beam scans the length of one discrete line segment of the length of said gravure cylinder.

41. The apparatus recited in claim 34, including:

an electronic signaling means electrically coupled to said modulation means:

data processing means for supplying data to said electronic signaling means;

first encoding means coupled to said gravure cylinder for providing signals representative of each horizontal line of the circumference of said gravure cylinder to said electronic signaling means;

second encoding means coupled to said movable mirror for providing signals representative of the position along each horizontal line to said electronic signaling means;

revolution counter means for providing signals indicative of the particular revolution of said gravure cylinder;

comparator means for providing an output when the output from said revolution counter means corresponds with the data from said data processing means;

register means for receiving the output from said comparator means and the output from a clock controlled by said second encoding means and providing output signals synchronized therewith; and deflection drive amplifier means for receiving the output signals from said register means and transmitting signals in response thereto to said modulation means.

* * * * *